United States Patent [19]

McCune

[11] Patent Number: 5,870,745
[45] Date of Patent: Feb. 9, 1999

[54] AUTOMATED SYSTEM AND METHOD FOR PROCESSING AND TRACKING REQUESTS AND RESPONSES REQUIRED FOR REPETITIVE TASKS

[75] Inventor: Robert F. McCune, Plano, Tex.

[73] Assignee: MCIWorldCom, Inc., Ga.

[21] Appl. No.: 721,406

[22] Filed: Sep. 26, 1996

[51] Int. Cl.⁶ .................................................. G06F 17/30
[52] U.S. Cl. ................. 707/10; 705/26; 705/28; 395/200.32; 395/200.74; 395/200.76
[58] Field of Search ..................... 707/505–508, 707/1–10; 705/20–29; 395/200.31, 200.32, 200.74, 200.76

[56] References Cited

U.S. PATENT DOCUMENTS 5,410,646  4/1995  Tondevold et al. ...................... 707/507
5,548,753  9/1994  Linstead et al. ............................ 707/1

OTHER PUBLICATIONS

"Guidelines for Product Change Notices," TR–OPT–000209, Bell Communications Research: Morristown, NJ (Aug. 1991).

Primary Examiner—Thomas G. Black
Assistant Examiner—Hosain T. Alam

[57] ABSTRACT

A system and method for automatically processing and tracking the processing of requests are described. Instructions for processing requests of interest are received. In a preferred embodiment, the requests are product change notices (PCNs). A request from a source of requests is received. Relevant information is extracted from the received request. An entry in a database is created, and the extracted information is stored in the database entry. The stored information is validated to determine if the received request is valid, and the received request is rejected if the stored information is not valid. If the stored information is valid, then additional information related to the request is retrieved from a source of additional information, and this retrieved information is stored in the database entry. Messages are sent to other users involved with processing the received request. Each message includes the database entry and optionally a request for a response. Responses from the other users are received and stored in the database entry. The responses are parsed for an indication of whether further processing is required. Any further processing is performed in accordance with instructions contained in the responses, and results of such processing is stored in the database entry.

16 Claims, 2 Drawing Sheets

AUTOMATED SYSTEM AND METHOD FOR PROCESSING AND TRACKING REQUESTS AND RESPONSES REQUIRED FOR REPETITIVE TASKS

BACKGROUND OF THE INVENTION

1. Field of the Invention

The present invention relates generally to computer systems and, more specifically, to the use of a computer system to automatically process and track requests and responses required for repetitive tasks.

2. Related Art

Conventionally, people process and track requests and responses for repetitive tasks by using a manual processing and tracking scheme (PTS). FIG. 1 illustrates a typical manual PTS environment 102.

A business 112 processes requests from customers and/or vendors (represented as a source of requests 108 in FIG. 1). The business 112 utilizes a manual PTS to process and track these requests.

In particular, a user 104 (who is employed by a business 112) receives instructions on a human-intelligible medium (such as a procedures manual) from a source of instructions 106 (such as a person or institution who is knowledgeable in processing requests, for example) on how to handle a request. The user 104 receives a request on a human-intelligible medium (such as a service order form written on paper) from a source of requests 108 (such as a customer or vendor). The user 104 processes the request according to the instructions and sends a message, on a human-intelligible medium, to other users 110 (such other users 110 may perform some role in processing the request). The message may include request. If the instructions require a response from the other users 110, then the user 104 may remind the other users 110 (who have not responded) to send their responses to the user 104. The user 104 waits until all responses are received from the other users 112.

The manual PTS environment 102 has several disadvantages. First, the manual PTS is administratively unwieldy. The user 104 must manually handle instructions, requests, messages, reminders, and responses which are on some human-intelligible media (i.e., printed matter on paper), and this human-intelligible media could be lost or damaged while the user 104 utilizes the manual PTS. Second, the manual PTS is prone to human error, inconsistent, and unreliable. As a result of human error, the user 104 may not consistently or reliably perform all of the many steps of the manual PTS. Third, the manual PTS is tedious, time-consuming, and expensive. The user 104 must perform tedious and time-consuming functions while utilizing the manual PTS, thereby potentially leading to more human errors. As a result of these disadvantages, the manual PTS may not be useful for effectively, efficiently, and accurately tracking the requests.

An example of such a business 112 which utilizes a manual PTS is a telecommunications company. A telecommunications company owns and maintains a telecommunications system. The telecommunications system includes equipment from a plurality of different manufacturers (also called vendors of the telecommunications company). Such equipment is added, modified, and replaced on a continuing basis. Thus, the telecommunications company necessarily needs to identify, test, and/or control any changes made by the manufacturers to any piece of equipment.

A manufacturer informs the telecommunications company of a change or modification to its product by issuing a Product Change Notice (PCN). Bell Communications Research (Bellcore) has established a well-known, standard format for PCNs. This is described in "Guidelines for Product Change Notices", *technical Reference*, TR-OPT-000209, Issue 5, August 1991 (hereinafter called the PCN standard), which is herein incorporated by reference in its entirety.

When a telecommunications company receives a PCN from a manufacturer on a piece of equipment, the telecommunications company must ensure that this PCN is reviewed by everyone who needs to review the effects that a change to this piece of equipment can have in the systems or on the products where the piece of equipment is being used.

Conventionally, a telecommunications company utilizes a multi-step, manual PTS to ensure that a received PCN is properly reviewed. First, the telecommunications company employs many users to check databases related to the systems or the products where the piece of equipment which is being changed is being used. Second, telecommunications company users determine whether the changed piece of equipment could be used to replace older pieces of equipment or products in the telecommunications company's telecommunications system, and whether the changed piece of equipment could be added to new telecommunications systems or networks of the telecommunications company. Telecommunications company users make this determination by reviewing test data from the manufacturer of the piece of equipment and/or by testing the piece of equipment in the telecommunications company's laboratory.

Telecommunications company users need to receive and understand instructions and requests, need to send messages, reminders, and reports to other users, and need to receive responses from the other users. Conventionally, telecommunications company users have utilized manual PTSs to track requests. As indicated above, however, such manual PTSs suffer from a number of disadvantages.

SUMMARY OF THE INVENTION

Briefly stated, the present invention is directed to a system and method for automatically processing and tracking the processing of requests. The present invention receives instructions for processing requests of interest. In a preferred embodiment, the requests are product change notices (PCNs). A request from a source of requests is received. Relevant information is extracted from the received request. An entry in a database is created, and the extracted information is stored in the database entry. The stored information is validated to determine if the received request is valid, and the received request is rejected if the stored information is not valid. If the stored information is valid, then additional information related to the request is retrieved from a source of additional information, and this retrieved information is stored in the database entry. Messages are sent to other users involved with processing the received request. Each message includes the database entry and optionally a request for a response. Responses from the other users are received and stored in the database entry. The responses are parsed for an indication of whether further processing is required. Any further processing is performed in accordance with instructions contained in the responses, and results of such processing is stored in the database entry.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Overview of the Invention

Figure 1:
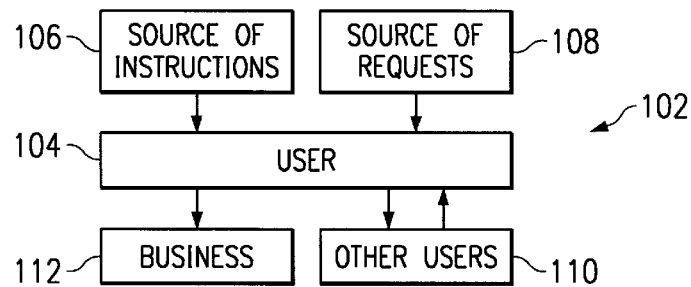
FIG. 1 is a block diagram of a typical manual processing and tracking environment.
Figure 2:
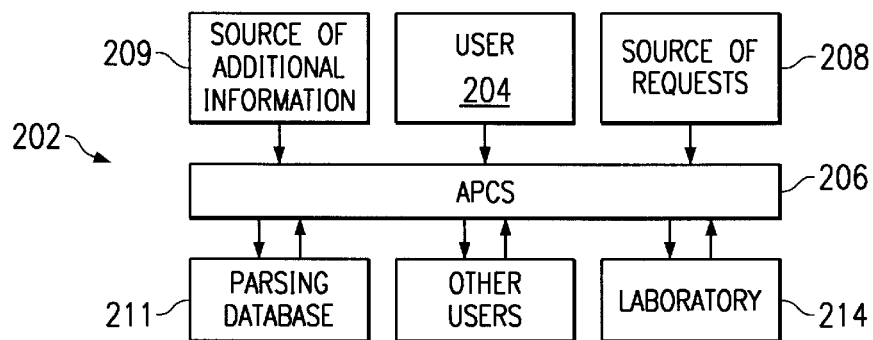
FIG. 2 is a block diagram of an automated processing and tracking system in accordance with a preferred embodiment of the present invention.

The present invention is directed to a system and method for providing an automatic processing and tracking scheme (PTS) to process and track requests and responses for repetitive tasks. FIG. 2 is a high-level block diagram of an automatic PTS system 202 in accordance with a preferred embodiment of the present invention. The operation of the invention shall now be briefly described.

During an initialization step, a user 204 inputs instructions, in electronic form, to an automatic PTS computer system (APCS) 206. In an embodiment of the invention, the APCS 206 is maintained by a telecommunications company for tracking PCNs, and the user 204 is employed by the telecommunications company.

The instructions include the procedure which the APCS 206 must follow in order to process a request, a set of phrases or sets of characters which are required to be recognized by the APCS 206 for a given task, a set of directories which comprise a source of additional information 209 (such as an electronic library, for example), validation criteria to be used to check the validity of the request, a list of data to retrieve from the source of additional information 209, a list of addresses of other users 210 who will receive messages and reminders from the APCS 206, and the response time (the amount of time within which a response from the other users 210 is due). In an embodiment of the invention, the request is a Product Change Notice (PCN), as described above, and the validation criteria represent the data items that must be contained in the PCN according to the PCN standard described above. These instructions are input for all requests (PCNs) of interest.

After initialization, the APCS 206 receives a request (a PCN), in electronic form, from a source of requests 208. The source of requests 208 may be a product manufacturer who is submitting a PCN describing a change or modification to its equipment.

During a parsing step, the APCS 206 extracts needed information from the request. The APCS 206 does this by parsing the request. During such parsing, the APCS 206 searches for the set of phrases or sets of characters previously inputted to the APCS 206 during the initialization step. These phrases or character sets correspond to field names. The APCS 206 knows that it has located a field containing relevant information when it locates in the PCN one of the set of phrases or sets of characters. The APCS 206 then extracts the information from this field.

After parsing the request for information, the APCS 206 stores this parsed information in a new request entry of a parsing database 211. This new request entry represents a repository of all information about the request.

After this storing step, the APCS 206 processes the request according to the appropriate instructions. During this processing step, the APCS 206 may retrieve additional information, in electronic form, from the source of additional information 209, and, subsequently, may take action based on the request. After processing the request, the APCS 206, according to the instructions, sends (1) the new request entry (from the parsing database 211), (2) the retrieved additional information, and (3) any requests for responses in electronic form to other users 210 on the address list entered during the initialization step.

Next, if required by the instructions, the APCS 206 sends reminders, in electronic form, to the other users 210 to send responses, in electronic form, to the APCS 206. The APCS 206 waits until all of the responses from the other users 210 are received. The amount of time that the APCS 206 waits for responses, called the response time, is inputted as part of the instructions during the initialization step. Finally, after this reminding step, the APCS 206 processes the responses according to the instructions. The above-described operation of the invention is described in greater detail below.

Structure of the Invention

Figure 3:
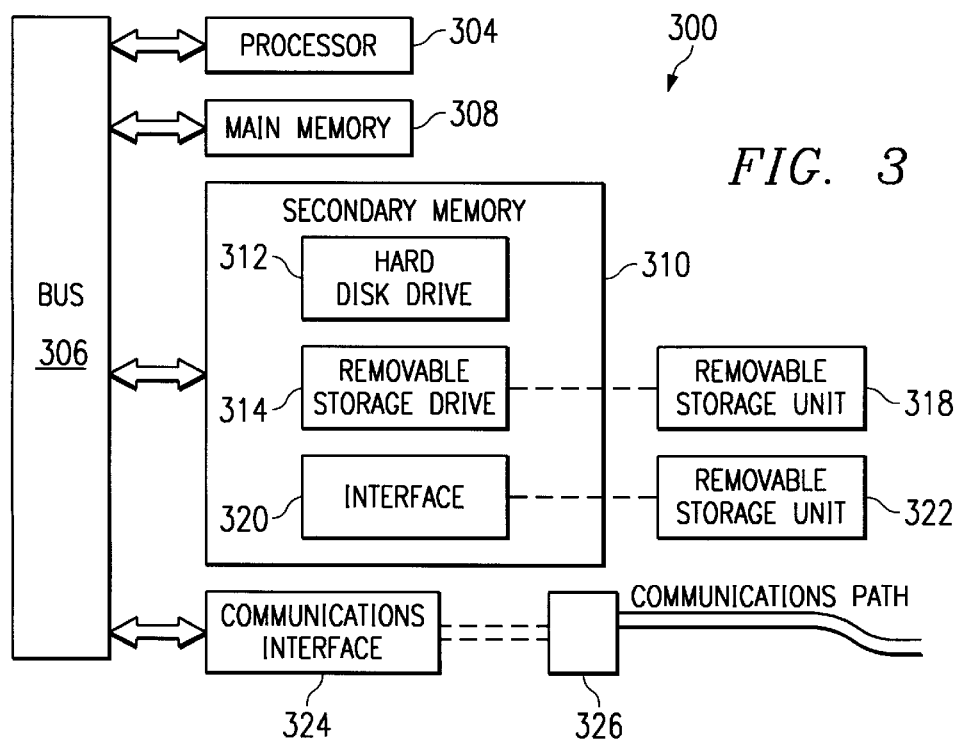
FIG. 3 is a block diagram of an exemplary computer system useful for implementing components of the present invention.

The preferred embodiment of the present invention is computer software running (that is, executing) within a computer system 300 shown in FIG. 3. The computer system 300 includes a processor 304, main memory 308, secondary memory 310, and a communications interface 324, all connected to a bus 306. The term "computer program product" is used to generally refer to a program stored in a removable storage unit 318 or hard disk drive 312. These computer program products are means for providing software to computer system 300.

Computer programs, also called computer control logic, are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention described herein. Accordingly, such computer programs represent controllers of the computer system 300.

In an embodiment where the invention is implemented using software, the software may be stored in a computer program product, for example, and loaded into computer system 300 using removable storage drive 314, or hard drive 312. Alternatively, the computer program product may be downloaded to computer system 300 over communications path 326.

In another embodiment, the invention is implemented primarily in hardware using, for example, hardware components such as application specific integrated circuits (ASIC). Implementation of a hardware state machine so as to perform the functions described herein will be apparent to persons skilled in the relevant art.

Operation of the Invention

Figure 4A:
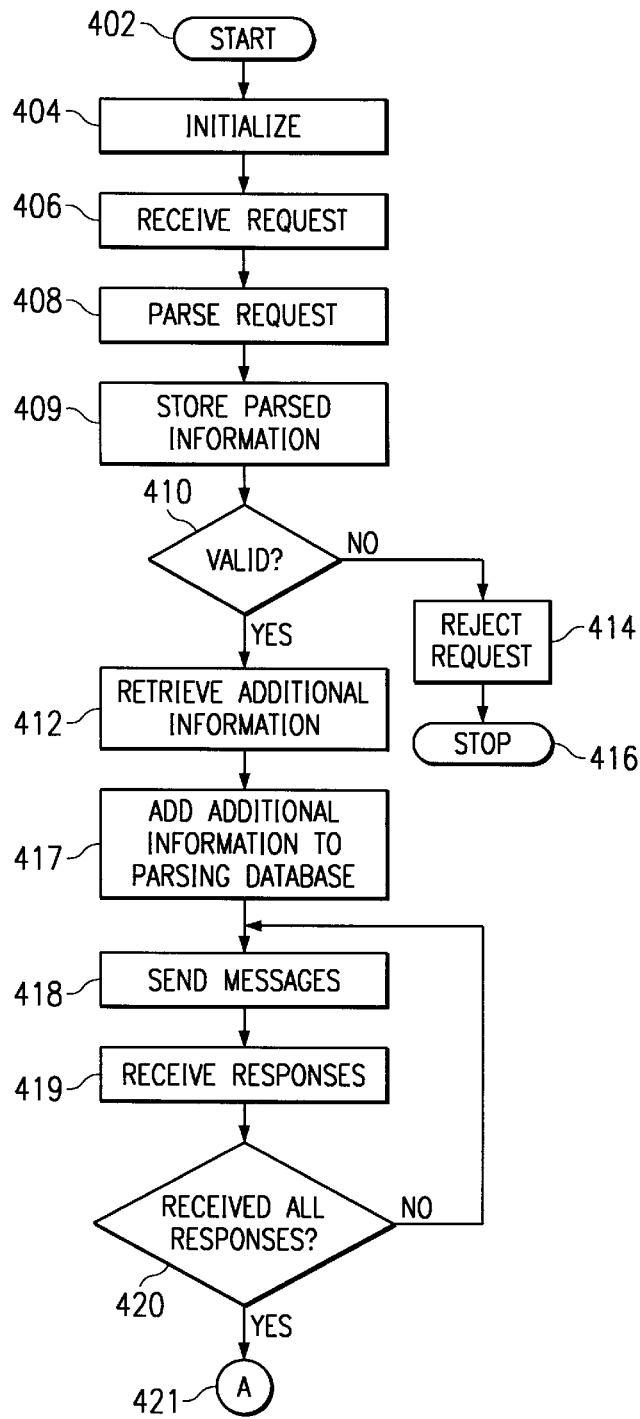
FIGS. 4A and 4B are flowcharts representing the preferred operation of the present invention.
Figure 4B:
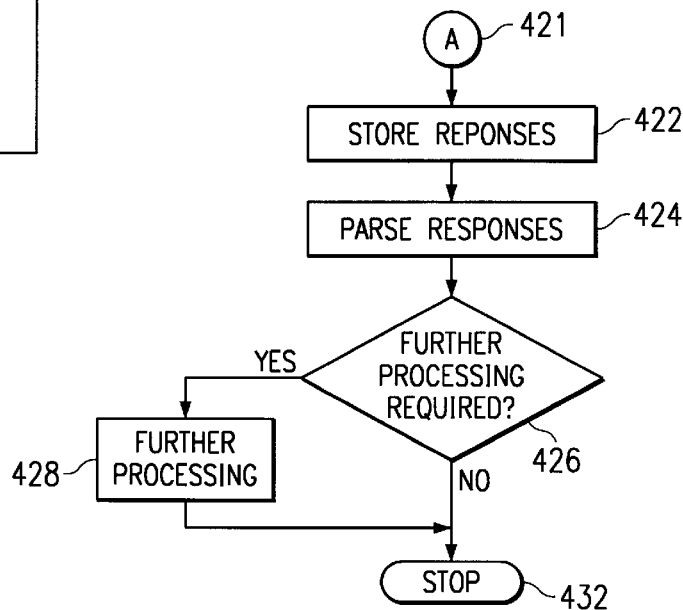

Referring to FIG. 4A, flowchart 400 represents the preferred operation of the automatic PTS computer system (APCS) 206. Flowchart 400 begins at step 402 with control passing immediately to step 404.

In step 404, the user 204 initializes the APCS 206 by inputting instructions to the APCS 206. These instructions include the procedures which the APCS 206 must follow in order to process requests (i.e., PCNs), a set of phrases and/or sets of characters which are required to be recognized by the APCS 206 for each request, a set of directories from an electronic library, for example, which comprise the source of additional information 209 for each request, validation criteria to be used to check the validity of each request, a list of data to retrieve from the source of additional information 209 for each request, a list of addresses of other users 210 who will receive messages and reminders from the APCS 206 for each request, and the response time (the amount of time within which a response from the other users 210 is due) for each request.

In step 406, a request, in electronic form, is received from the source of requests 208. In an embodiment of the inventor, the request is a PCN.

In step 408, pertinent information is extracted from the request. If the request is a PCN, for example, information such as the manufacturer, product, date of the change, and information describing the change is extracted from the PCN. The information extracted during step 406 varies from one request to another. Preferably, step 408 is performed by parsing the request to "read" for or compare the request to the set of phrases or sets of characters inputted during the initializing step (step 404). Such comparison is done to identify fields in the request. For example, one field may be the product name, which may be prefaced by the label "Product Name." In this case, the request is parsed until "Product Name" is found. When "Product Name" is found, the APCS 206 knows that it has located the product name field. The APCS 206 then extracts product name information that follows the "Product Name" label from the request.

In step 409, the information retrieved from the request in step 408 is stored in a new request entry in a parsing database 211 (also called the request database). This request entry is used to store information about the request for the duration of processing of the request. Thus, the entry is a central repository for information and status on the request.

In step 410, the PCN is validated. This is done by validating the stored information by comparing the stored information to the validation criteria inputted during initialization. For example, in order to satisfy the PCN standard, a PCN may need to include some mandatory information such as the manufacturer and the product name. During step 410, the APCS 206 verifies that this information is contained in the request entry, and that the information is in the proper format. The mandatory information and the format for such information for each request was input during step 404. If the stored information meets the validation criteria, then control passes to step 412. Otherwise, control passes to step 414.

In step 414, the request is rejected. The APCS 206 informs the user 204 of the rejection. At this point, operation of flowchart 400 is complete, as indicated by step 416.

In step 412, additional information related to the request is retrieved from the source of additional information 209. This is done by reference to the list of data to retrieve from the source of additional information 209 for the request input during step 404. For example, in order to process a PCN related to a particular product, it may be useful to have the engineering schematics and the user manual for the product. In this case, in step 412, such engineering schematics and user manual may be retrieved from an electronic technical library. The additional information required for each request varies from one request to the next, and is identified in step 404.

In step 417, the retrieved information relating to the request is stored in the request entry.

In step 418, (1) the request entry in the parsing database 211 and (2) any requests for responses are sent in electronic form to the other users 210 on the address list for the request being processed. For example, the processing of a PCN involving a new version of a software program may require the testing of the software program by a particular lab. If this is the case, then the address list will include an identification of the lab. In step 418, the request entry is sent to the lab. Also, the following request is also sent: "Please test the new version of the software in our telecommunication system, and respond with the test results." The list of other users 210 to which the request entry and response requests (and the nature of such response requests) are sent vary from request to request and are defined in step 404.

In step 419, electronic responses are received from one or more of the other users 210. For example, a response may be: "We have tested the new software, and it passed." Or, a response may be: "We have determined that no testing is necessary." Another response may be: "We recommend that further testing be conducted by XYZ lab."

In step 420, if a response has not been received within the required response time for the request, then control returns to step 418, where electronic reminders are automatically sent. Thus, processing does not proceed past step 420 until all required responses have been received.

Control passes to step 422 once all responses have been received from the other users 210. In step 422, the responses for the request are stored in the request entry in the parsing database 211.

In step 424, the responses are parsed (in the manner described above) for an indication of whether further processing is required for the request.

In step 426, if it is determined that further processing of the request is required, then control passes to step 428. Otherwise, processing of flowchart 400 is complete, as indicated by step 432.

In step 428, the additional processing identified in the responses (step 424) is performed. Typically, instructions for performing such additional processing is included in the responses. The results of such additional processing are stored in the request entry.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of automatically processing and tracking the processing of a request related to a product change, comprising the steps of:

(1) receiving initial instructions for processing the request related to a product change;

(2) receiving the request related to a product change from a source of requests;

(3) extracting relevant information from the received request related to a product change, depending upon the type of request, by parsing the request related to a product change to read one or more fields associated with the type of the request related to a product change;

(4) creating an entry in a database, and storing said extracted relevant information in said database entry, as a stored information,
 wherein said stored information is maintained so long as the request related to a product change is valid;

(5) validating said stored information, by ensuring, that said stored information has acceptable content and format as designated during the step of receiving said initial instructions, in order to determine if the received request related to a product change is valid;

(6) rejecting he received request related to a product change if said stored information is not valid;

(7) if said stored information is valid, then:
 (a) retrieving any needed additional information related to the received request related to a product change from a source of additional information;
 (b) storing said retrieved information in said entry in said database; and
 (c) sending one or more messages to other users involved with processing the received request related to a product change,
  wherein said one or more messages each include said entry in said database and optionally include a request for a response.

2. The method of claim 1, further comprising the steps of:

(8) receiving responses from said other users; and (9) storing said responses in said entry in said database.

3. The method of claim 2, further comprising the steps of:

(10) parsing said responses for an indication of whether further processing is required;

(11) performing any further required processing in accordance with instructions contained in said responses; and

(12) storing results of said further required processing in said entry in said database.

4. The method of claim 1, wherein step (1) comprises the step of:
 receiving one or more phrases or sets of characters for the received request related to a product change, and
 wherein step (3) comprises the steps of:
  identifying one or more relevant fields in the received request related to a product change by searching in the received request related to a product change for one or more phrases or sets of characters associated with the received request related to a product change and provided in step (1); and
 extracting information from said identified one or more relevant fields.

5. The method of claim 1, wherein step (1) comprises the step of:
 receiving validation criteria for the received request related to a product change, to be used to check if the received request related to a product change is valid, and
 wherein step (5) comprises the step of:
  comparing said extracted information to said validation criteria.

6. The method of claim 1, wherein step (1) comprises the step of:
 receiving for the received request related to a product change one or more sets of directories containing additional information relating to the received request related to a product change, and
 wherein step (7) comprises the step of:
  receiving additional information related to the received request related to a product change from said one or more sets of directories related to the received related to a product change.

7. The method of claim 1, wherein step (1) comprises the step of
 receiving a list of addresses of said other users, and
 wherein step (9) comprises the step of:
  sending said one or more messages to said other users according to said address list.

8. The method of claim 1, wherein said request for a response in each of said messages optionally includes a task which a recipient of said request for a response is required to perform, wherein said recipient performs said task and sends a response containing results of performance of said task.

9. A system for automatically processing and tracking the processing of a request related to a product change, comprising:
 instruction receiving means for receiving initial instructions for processing the request related to a product change;
 request receiving means for receiving the request related to a product change from a source of requests;
 information extracting means for extracting relevant information from the received request related to a product change, depending upon the type of request, by parsing the request related to a product change to read one or more fields associated with the type of the request related to a product chance;
 means for creating an entry in a database, and storing said extracted relevant information in said database entry as a stored information,
  wherein said stored information is maintained so long as the request related to a product change is valid;
 validating means for validating said stored information, by ensuring that said stored information has acceptable content and format as designated during the step of receiving said initial instructions, in order to determine if the received request related to a product change is valid;
 rejecting means for rejecting the received request related to a product change if said stored information is not valid;
 additional information retrieving means for retrieving any needed additional information related to the received request related to a product change from a source of additional information if said stored information is valid;
 means for storing said retrieved information in said entry in said database; and
 sending means for sending one or more messages to other users involved with processing the received request related to a product change, wherein said one or more messages each include said entry in said database and optionally include a request for a response.

10. The system of claim 9, further comprising:
 means for receiving responses from said other users; and
 means for storing said responses in said entry in said database.

11. The system of claim 9, further comprising:
 means for parsing said responses for an indication of whether further processing is required;
 means for performing any further required processing in accordance with instructions contained in said responses; and means for storing results of said further required processing in said entry in said database.

12. The system of claim 9, wherein said instruction receiving means receives one or more phrases or sets of characters for the received request related to a product change, and wherein said information extracting means comprises:

means for identifying one or more relevant fields in the received request related to a product change by searching in the received request related to a product change for one or more phrases or sets of characters associated with the received request related to a product change; and means for extracting information from said identified one or more relevant fields.

13. The system of claim 9, wherein said instruction receiving means receives validation criteria the received request related to a product change, to be used to check if the received request related to a product change is valid, and wherein said validating means comprises:

means for comparing said extracted information to said validation criteria.

14. The system of claim 9, wherein said instruction receiving means receives for the received request related to a product change one or more sets of directories containing additional information relating to the received request related to a product change, and wherein said additional information retrieving means comprises:

means for receiving additional information related to the received request related to a product change from said one or more sets of directories related to the received request related to a product change.

15. The system of claim 9, wherein said instruction receiving means receives a list of addresses of said other users, and wherein said sending means comprises:

means for sending said one or more messages to said other users according to said address list.

16. The system of claim 9, wherein said request for a response in each of said messages optionally includes a task which a recipient of said request for a response is required to perform, wherein said recipient performs said task and sends a response containing results of performance of said task.

* * * * *